Patented Apr. 25, 1933

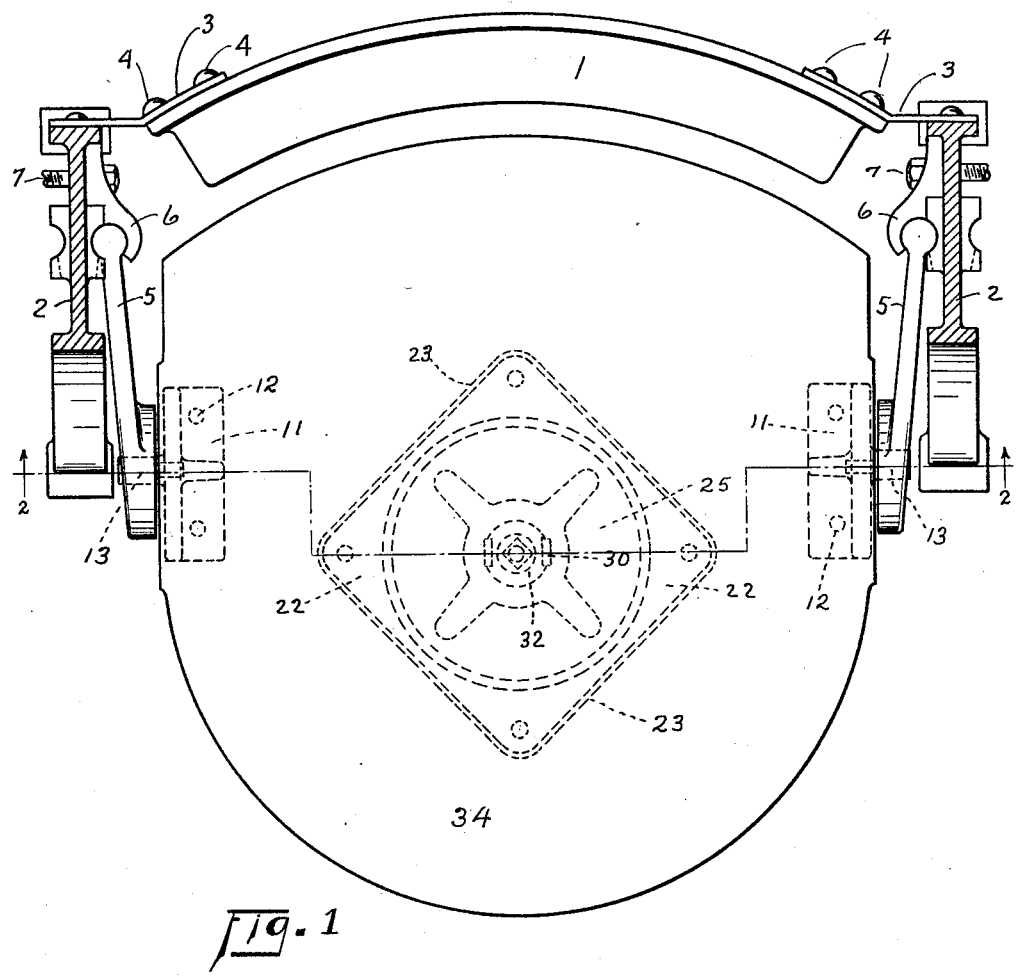

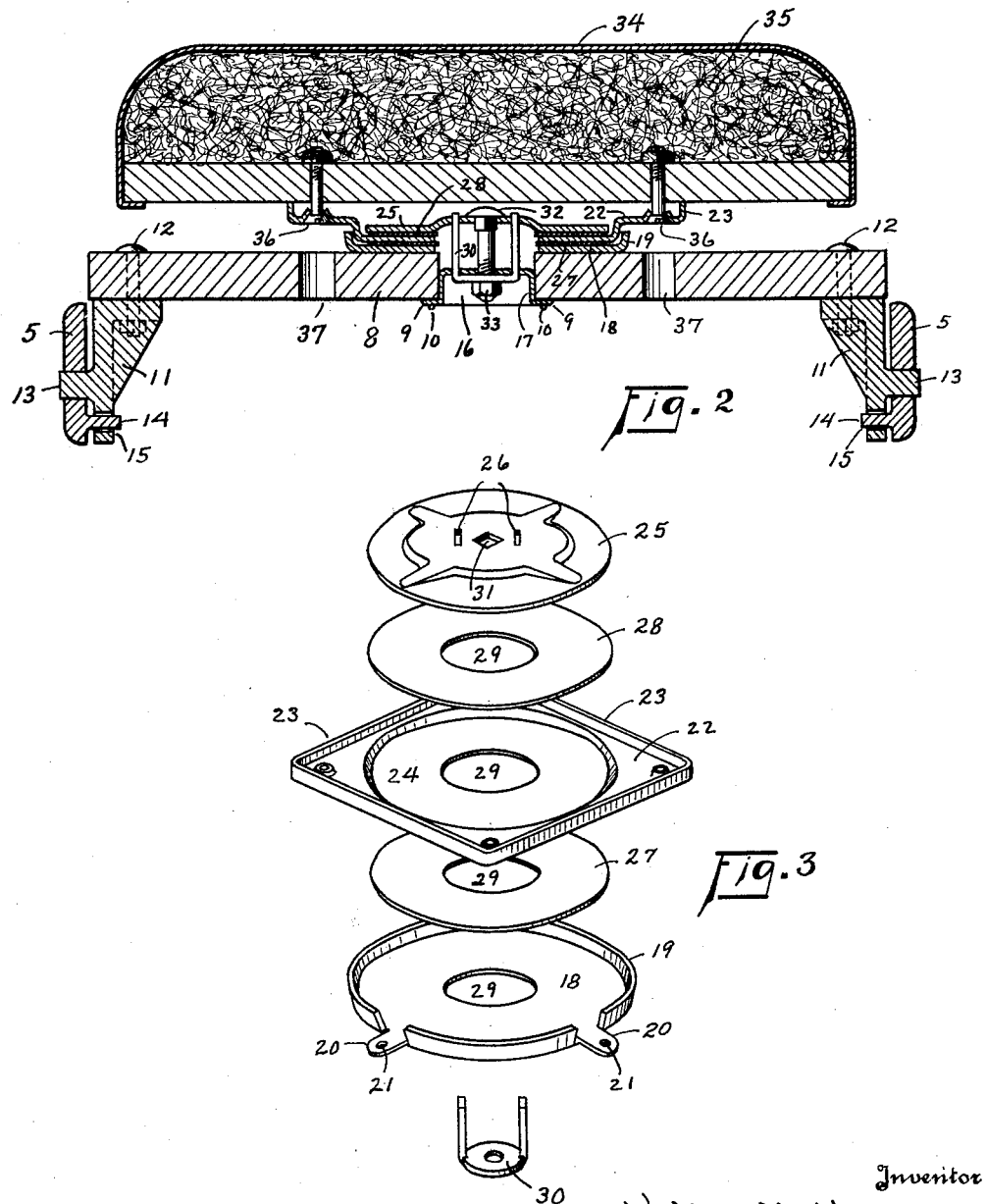

1,906,061

UNITED STATES PATENT OFFICE

WALTER M. HANSON, OF GRAND RAPIDS, MICHIGAN, ASSIGNOR TO AMERICAN SEATING COMPANY, OF GRAND RAPIDS, MICHIGAN, A CORPORATION OF NEW JERSEY

SEAT

Application filed December 19, 1930. Serial No. 503,456.

The present invention relates to seats, and more particularly to seats especially adapted for use in theatres, auditoriums and other similar places.

The invention herein shown and described is an improvement over that shown in my co-pending application, Serial Number 494,472 for Seats, filed November 10, 1930, which has matured into Patent No. 1,875,449, dated Sept. 6, 1932, and the main objects of the invention are to provide a seat of the character above indicated which is rotatably mounted; to provide a theatre seat which may be revolved when occupied; to provide a seat which is horizontally rotatable and vertically swingable; to provide a seat which when occupied permits ready ingress and egress of other persons passing such occupied seat without undue annoyance and discomfort of the occupant; and, to provide a seat having novel features for attaining the above objects.

An illustrative embodiment of the invention is shown in the accompanying drawings, wherein—

Figure 1 is a top plan view of the seat partly in section, the dotted lines indicating hidden parts and the manner of their assembly;

Figure 2 is a cross sectional view thereof taken on lines 2—2 of Figure 1; and

Figure 3 is an enlarged perspective view of several unassembled individual parts disposed with respect to their assembled relation.

The seat structure herein shown and described is particularly adapted for use in theatres, civic auditoriums and other similar public and semi-public places. The seat is rotatable when occupied by the occupant and is so designed that occupants thereof need not rise but merely turn when other persons seek to pass such occupied seats.

Referring to the drawings in which like numerals represent like parts in the several views, a seat back 1 of circular form is rigidly secured between a pair of vertically disposed seat ends 2 by means of supporting brackets 3 secured to the seat ends and seat back by rivets 4. Seating in arcuate rows is provided by means of a pair of laterally disposed arms 5 which are adjustably horizontally swingably secured to the seat ends on their inner sides by means of clamps 6 and adjusting bolts 7.

A seat supporting member 8 is rigidly secured to a pair of brackets 11 by rivets 12, the bracket trunnions 13 being vertically swingably mounted inside the outer ends of the arms 5. The swinging movement of the seat supporting member is limited by lugs 14 projecting through the arcuate slots 15 of the brackets 11.

The seat supporting member 8 is provided with a centrally disposed bore 16 in which is inserted an inverted dished member 17 having outwardly projecting flanges 9 which are secured to the underside of the seat supporting member 8 by screws 10.

Secured to the seat supporting member 8 is a disc 18 having a peripheral upturned flange 19 and laterally projecting ears 20 struck from the peripheral flanged portion and forming means for securing the disc to the seat supporting member by passing screws through the apertures 21 thereof. A rectangular member 22 for supporting the seat proper and having peripheral flanged edges 23 has a dished portion 24 adapted to rotatably fit within the annular recess of the disc 18.

A clamping member 25 provided with a pair of oppositely disposed slots 26 is adapted to fit within the annular dished portion 24 of the member 22. A pair of friction bearing discs 27, 28 of fibre or other suitable composition are disposed on opposite sides of the member 22 between the member 18 and the clamping plate 25 and each disc together with the members 18 and 22 are provided with registering circular openings 29 for purposes hereinafter explained.

A key 30, here shown as a bifurcated member, is passed upwardly through the inverted dished member 17, through the circular openings 29 of the members 18, disc 27, member 22 and disc 28 respectively and through slots 26 of the clamping plate 25.

The clamping plate is provided with a squared opening 31 between the slots 26 for receiving the square head of the bolt 32 which passes through the clamping plate 25, disc 28, member 22, disc 27 and member 18 respectively and which with its nut 33 serves to rotatably secure the member 22 and the clamping plate 25 to the member 18 when in their assembled relation.

The seat 34 is provided with a suitable filler 35, such as hair or the like, and is secured to the member 22 by bolts 36. Apertures 37 within the seat supporting member 8 provide access for a screw driver for securing the bolts 36 to the seat.

It will thus be seen that the seat not only swings on its horizontal axis but may likewise be rotated by the occupant thereof who need not rise when other persons seek ingress and egress past such occupied seat.

While but one specific embodiment of this invention has been herein shown and described, it will be understood that numerous details of the construction shown may be altered or omitted without departing from the spirit of this invention as defined by the following claims.

I claim:

1. In a device of the class described, a pair of seat ends, a seat supporting member secured therebetween and provided with a centrally disposed bore, a dished member secured within said bore, a disc having a peripheral flanged edge secured to said seat supporting member, a member having a dished portion adapted to fit within the peripheral flanged edge of said disc, a clamping plate fitting within said dished portion and a bolt secured to said dished member and said clamping plate for securing said member rotatably with respect to said clamping plate and said disc.

2. In a device of the class described, a seat supporting member provided with a centrally disposed bore, an inverted dished member secured within the bore, a disc having a peripheral flanged edge secured to said seat supporting member, a member having a dished portion adapted to turnably fit within the peripheral flanged edge of said disc, a clamping plate fitting within said dished portion in turnable relation therewith, a bifurcated member engaging said inverted dished member and the clamping plate for holding the same in non-turnable relation, and a bolt connecting the clamping plate and said inverted dished member and forming the axis about which the member having said dished portion turns relatively to said disc.

In testimony whereof I have hereunto set my hand at Grand Rapids, Michigan this 16th day of December, 1930.

WALTER M. HANSON.